US012775824B2

(12) United States Patent
Zhou et al.

(10) Patent No.: US 12,775,824 B2
(45) Date of Patent: Oct. 27, 2026

(54) THREE-DIMENSIONAL SHAPE GENERATION

(71) Applicant: Adobe Inc., San Jose, CA (US)

(72) Inventors: Yang Zhou, Mountain View, CA (US); Yicong Hong, Canberra (AU); Sai Bi, San Jose, CA (US); Kai Zhang, San Jose, CA (US); Hao Tan, San Jose, CA (US); Feng Liu, Beaverton, OR (US); Difan Liu, San Jose, CA (US)

(73) Assignee: Adobe Inc., San Jose, CA (US)

( * ) Notice: Subject to any disclaimer, the term of this patent is extended or adjusted under 35 U.S.C. 154(b) by 119 days.

(21) Appl. No.: 18/753,396

(22) Filed: Jun. 25, 2024

(65) Prior Publication Data

US 2025/0390713 A1 Dec. 25, 2025

(51) Int. Cl.
*G06N 3/0455* (2023.01)
*G06T 17/05* (2011.01)

(52) U.S. Cl.
CPC ........... *G06N 3/0455* (2023.01); *G06T 17/05* (2013.01)

(58) Field of Classification Search
CPC ...... G06N 3/0455; G06N 3/047; G06T 17/05; G06T 17/00; G06T 19/20
See application file for complete search history.

(56) References Cited

U.S. PATENT DOCUMENTS

2025/0078392 A1* 3/2025 Shi ........................ G06T 15/205
2025/0322179 A1* 10/2025 Sharma ................... G06F 40/58

OTHER PUBLICATIONS

Wu, Shuang, et al. “Direct3d: Scalable image-to-3d generation via 3d latent diffusion transformer.” arXiv:2405.14832v1 [cs.CV] ( May 23, 2024): 1-15 (Year: 2024).*
Lu, Zeyu, “Hierarchical Diffusion Autoencoders and Disentangled Image Manipulation”, arXiv:2304.11829 [cs.CV] (Apr. 25, 2023) (Year: 2023).*
Shim et al. (Jaehyeok Shim, Changwoo Kang, Kyungdon Joo, “Diffusion-Based Signed Distance Fields for 3D Shape Generation”, Proceedings of the IEEE/CVF Conference on Computer Vision and Pattern Recognition (CVPR), 2023, pp. 20887-20897) (Year: 2023).*
Mitsuba 3, Physically Based Renderer, Available online at: https://mitsuba-renderer.org, 2022, 1 page.
Achlioptas et al., Learning Representations and Generative Models for 3D Point Clouds, Proceedings of Machine Learning Research, Jun. 12, 2018, 10 pages.
Achlioptas et al., ShapeGlot: Learning Language for Shape Differentiation, Proceedings of the IEEE/CVF International Conference on Computer Vision, May 8, 2019, 23 pages.

(Continued)

*Primary Examiner* — Daniel F Hajnik
(74) *Attorney, Agent, or Firm* — Kilpatrick Townsend & Stockton LLP

(57) ABSTRACT

In some embodiments, a computing system receives an input prompt describing a 3-dimensional (3D) object. The computing system generates one or more levels of latent features based on the input prompt using a latent diffusion model. The computing system decodes the one or more levels of latent features to generate a 3D shape representation using a hierarchical autoencoder. The computing system generates an output shape based on the 3D shape representation.

19 Claims, 10 Drawing Sheets

(56) References Cited

OTHER PUBLICATIONS

Cai et al., Learning Gradient Fields for Shape Generation, In Computer Vision—ECCV 2020: 16th European Conference, Aug. 18, 2020, pp. 1-33.
Chan et al., Efficient Geometry-aware 3D Generative Adversarial Networks, Computer Vision and Pattern Recognition, Apr. 27, 2022, 27 pages.
Chang et al., MaskGIT: Masked Generative Image Transformer, Computer Vision and Pattern Recognition, Feb. 8, 2022, pp. 1-23.
Chang et al., Muse: Text-to-Image Generation via Masked Generative Transformers, Computer Vision and Pattern Recognition, Jan. 2, 2023, pp. 1-22.
Chang et al., Shape Net: An Information-Rich 3D Model Repository, Computer Science, Graphics, Dec. 9, 2015, 11 pages.
Chen et al., Decor-Gan: 3D Shape Detailization by Conditional Refinement, Computer Vision and Pattern Recognition, Mar. 29, 2021, pp. 1-25.
Chen et al., Learning Implicit Fields for Generative Shape Modeling, In Proceedings of the IEEE/CVF Conference on Computer Vision and Pattern Recognition, Available online at: https://arxiv.org/pdf/1812.02822.pdf, Sep. 16, 2019, 10 pages.
Chen et al., Microsoft COCO Captions: Data Collection and Evaluation Server, Computer Vision and Pattern Recognition, Apr. 3, 2015, pp. 1-7.
Chen et al., Text2Shape: Generating Shapes from Natural Language by Learning Joint Embeddings, Computer Vision—ACCV 2018—14th Asian Conference on Computer Vision, Revised Selected Papers, Mar. 22, 2018, pp. 1-35.
Deitke et al., Objaverse: A Universe of Annotated 3D Objects, Computer Vision and Pattern Recognition, Dec. 15, 2022, pp. 1-15.
Devlin et al., BERT: Pre-Training of Deep Bidirectional Transformers for Language Understanding, Available online at: https://arxiv.org/pdf/1810.04805.pdf, May 24, 2019, 16 pages.
Dhariwal et al., Diffusion Models Beat GANs on Image Synthesis, Available online at: https://arxiv.org/abs/2105.05233, Jun. 1, 2021, pp. 1-44.
Dosovitskiy et al., An Image is Worth 16x16 Words: Transformers for Image Recognition at Scale, Published as a conference paper at International Conference on Learning Representations 2021, Jun. 3, 2021, pp. 1-22.
Dubrovina et al., Composite Shape Modeling via Latent Space Factorization, Computer Vision and Pattern Recognition, Oct. 30, 2019, 10 pages.
Fu et al., ShapeCrafter: A Recursive Text-Conditioned 3D Shape Generation Model, Computer Vision and Pattern Recognition, Apr. 8, 2023, pp. 1-19.
Gal et al., MRGAN: Multi-Rooted 3D Shape Generation with Unsupervised Part Disentanglement, Proceedings of the IEEE/CVF International Conference on Computer Vision, Jun. 25, 2020, 18 pages.
Gao et al., GET3D: A Generative Model of High Quality 3D Textured Shapes Learned from Images, Available Online at: https://arxiv.org/pdf/2209.11163.pdf, Sep. 22, 2022, 39 pages.
Goodfellow et al., Generative Adversarial Networks, Communications of the ACM, vol. 63, No. 11, Available online at: https://dl.acm.org/doi/pdf/10.1145/3422622, Nov. 2020, pp. 139-144.
Hao et al., DualSDF: Semantic Shape Manipulation using a Two-Level Representation, Proceedings of the IEEE/CVF Conference on Computer Vision and Pattern Recognition, Apr. 6, 2020, 16 pages.
Hessel et al., CLIPScore: A Reference-free Evaluation Metric for Image Captioning, Proceedings of the 2021 Conference on Empirical Methods in Natural Language Processing, Mar. 23, 2022, 15 pages.
Heusel et al., GANs Trained by a Two Time-Scale Update Rule Converge to a Local Nash Equilibrium, Proceedings of the 31st International Conference on Neural Information Processing Systems, Dec. 2017, pp. 1-12.
Ho et al., Classifier-Free Diffusion Guidance, Available at arXiv preprint arXiv:2207.12598, Jul. 26, 2022, pp. 1-14.
Ho et al., Classifier-Free Diffusion Guidance, In NeurIPS 2021 Workshop on Deep Generative Models and Downstream Applications, 2021, pp. 1-8.
Ho et al., Denoising Diffusion Probabilistic Models, Advances in Neural Information Processing Systems, vol. 33, Dec. 16, 2020, 25 pages.
Ho et al., Imagen Video: High Definition Video Generation with Diffusion Models, Computer Vision and Pattern Recognition, Oct. 5, 2022, pp. 1-18.
Ho et al., Video Diffusion Models, Computer Vision and Pattern Recognition, Jun. 22, 2022, pp. 1-15.
Holtzman et al., The Curious Case of Neural Text Degeneration, International Conference on Learning Representations, Feb. 14, 2020, pp. 1-16.
Hui et al., Neural Wavelet-domain Diffusion for 3D Shape Generation, Computer Vision and Pattern Recognition, Sep. 19, 2022, 9 pages.
Hui et al., Progressive Point Cloud Deconvolution Generation Network, Computer Vision—ECCV 2020: 16th European Conference, Jul. 10, 2020, pp. 1-27.
Ibing et al., 3D Shape Generation with Grid-based Implicit Functions, Proceedings of the IEEE/CVF Conference on Computer Vision and Pattern Recognition, Jul. 22, 2021, 14 pages.
Jiang et al., Hierarchical Detail Enhancing Mesh-Based Shape Generation with 3D Generative Adversarial Network, Graphics, Sep. 22, 2017, pp. 1-9.
Kim et al., SoftFlow: Probabilistic Framework for Normalizing Flow on Manifolds, Computer Vision and Pattern Recognition, Nov. 15, 2020, pp. 1-17.
Kimura et al., ChartPointFlow for Topology-Aware 3D Point Cloud Generation, Proceedings of the 29th ACM International Conference on Multimedia, Oct. 20-24, 2021, 25 pages.
Kleineberg et al., Adversarial Generation of Continuous Implicit Shape Representations, Available online at: https://export.arxiv.org/pdf/2002.00349v2, Mar. 26, 2020, 6 pages.
Kong et al., DiffWave: A Versatile Diffusion Model for Audio Synthesis, International Conference on Learning Representations, Mar. 30, 2021, pp. 1-17.
Li et al., BLIP: Bootstrapping Language-Image Pre-Training for Unified Vision-Language Understanding and Generation, Available online at: https://arxiv.org/pdf/2201.12086, Feb. 15, 2022, 12 pages.
Li et al., BLIP-2: Bootstrapping Language-Image Pre-training with Frozen Image Encoders and Large Language Models, Computer Vision and Pattern Recognition, Jun. 15, 2023, 13 pages.
Li et al., Diffusion-SDF: Text-to-Shape via Voxelized Diffusion, Available online at: https://arxiv.org/pdf/2212.03293, May 7, 2023, pp. 1-13.
Li et al., EditVAE: Unsupervised Part-Aware Controllable 3D Point Cloud Shape Generation, Proceedings of the AAAI Conference on Artificial Intelligence, Mar. 30, 2022, 14 pages.
Li et al., Learning Part Generation and Assembly for Structure-Aware Shape Synthesis, Proceedings of the AAAI Conference on Artificial Intelligence, vol. 34, Jan. 25, 2020, 8 pages.
Lin et al., Magic3D: High-resolution text-to-3D content creation, InProceedings of the IEEE/CVF Conference on Computer Vision and Pattern Recognition 2023, Mar. 25, 2023, pp. 1-18.
Liu et al., Pre-Train, Prompt, and Predict: A Systematic Survey of Prompting Methods in Natural Language Processing, ACM Computing Surveys, vol. 55, No. 9, Jul. 28, 2021, pp. 1-46.
Liu et al., Towards Implicit Text-Guided 3D Shape Generation, Computer Vision and Pattern Recognition, Mar. 28, 2022, 15 pages.
Lorensen et al., Marching Cubes: A High Resolution 3D Surface Construction Algorithm, ACM Siggraph Computer Graphics, vol. 21, No. 4, Jul. 1, 1987, pp. 163-169.
Luo et al., Diffusion Probabilistic Models for 3D Point Cloud Generation, Proceedings of the IEEE/CVF Conference on Computer Vision and Pattern Recognition, Jun. 13, 2021, 9 pages.
Mittal et al., AutoSDF: Shape Priors for 3D Completion, Reconstruction and Generation, In Proceedings of the IEEE/CVF Conference on Computer Vision and Pattern Recognition, Mar. 9, 2023, pp. 306-315.

(56) References Cited

OTHER PUBLICATIONS

Nichol et al., GLIDE: Towards Photorealistic Image Generation and Editing with Text-Guided Diffusion Models, Available online at: https://arxiv.org/abs/2112.10741, Mar. 8, 2022, 20 pages.
Nichol et al., Point-E: A System for Generating 3D Point Clouds from Complex Prompts, Available online at: https://arxiv.org/pdf/2212.08751, Dec. 16, 2022, 14 pages.
Papineni et al., Bleu: A Method for Automatic Evaluation of Machine Translation, Proceedings of the 40th Annual Meeting on Association for Computational Linguistics, Jul. 2002, pp. 311-318.
Park et al., DeepSDF: Learning Continuous Signed Distance Functions for Shape Representation, Proceedings of the IEEE/CVF Conference on Computer Vision and Pattern Recognition, Jan. 16, 2019, pp. 1-19.
Poole et al., DreamFusion: Text-to-3D using 2D Diffusion, Available online at: https://arxiv.org/pdf/2209.14988, Sep. 29, 2022, pp. 1-18.
Postels et al., Go with the Flows: Mixtures of Normalizing Flows for Point Cloud Generation and Reconstruction, International Conference on 3D Vision (3DV), Nov. 29, 2021, 22 pages.
Radford et al., Learning Transferable Visual Models From Natural Language Supervision, Proceedings of the 38th International Conference on Machine Learning, Feb. 26, 2021, 16 pages.
Raffel et al., Exploring the Limits of Transfer Learning with a Unified Text-to-Text Transformer, Journal of Machine Learning Research, vol. 21, Jul. 2020, pp. 1-67.
Ramesh et al., Hierarchical Text-Conditional Image Generation with CLIP Latents, Available online at: https://arxiv.org/pdf/2204.06125, Apr. 13, 2022, 27 pages.
Ramesh et al., Zero-Shot Text-to-Image Generation, In International Conference on Machine Learning, Feb. 26, 2021, 11 pages.
Razavi et al., Generating Diverse High-Fidelity Images with VQ-VAE-2, Available online at: https://arxiv.org/pdf/1906.00446.pdf, Jun. 2019, 15 pages.
Richardson et al., TEXTure: Text-Guided Texturing of 3D Shapes, Available online at: https://arxiv.org/pdf/2302.01721, Feb. 3, 2023, pp. 1-13.
Rombach et al., High-Resolution Image Synthesis with Latent Diffusion Models, In Proceedings of the IEEE/CVF Conference on Computer Vision and Pattern Recognition, Apr. 13, 2022, pp. 1-45.
Saharia et al., Photorealistic Text-to-Image Diffusion Models with Deep Language Understanding, Available online at: https://arxiv.org/pdf/2205.11487, May 23, 2022, pp. 1-46.
Sanghi et al., CLIP-Sculptor: Zero-Shot Generation of High-Fidelity and Diverse Shapes from Natural Language, Available online at: https://arxiv.org/pdf/2211.01427, May 24, 2023, 10 pages.
Schuhmann et al., LAION-5B: An Open Large-Scale Dataset for Training Next Generation Image-Text Models, Available online at: https://arxiv.org/pdf/2210.08402, Oct. 16, 2022, pp. 1-50.
Smith et al., Improved Adversarial Systems for 3D Object Generation and Reconstruction, Conference on Robot Learning, Oct. 30, 2017, pp. 1-10.
Sohl-Dickstein et al., Deep Unsupervised Learning using Nonequilibrium Thermodynamics, In International Conference on Machine Learning, Available online at: https://arxiv.org/pdf/1503.03585.pdf, Nov. 18, 2015, 18 pages.
Song et al., Generative Modeling by Estimating Gradients of the Data Distribution, Advances in Neural Information Processing Systems, Oct. 10, 2020, pp. 1-23.
Szegedy et al., Rethinking the Inception Architecture for Computer Vision, In Proceedings of the IEEE conference on Computer vision and Pattern Recognition, Jun. 2016, pp. 2818-2826.
Tatarchenko et al., What do Single-View 3D Reconstruction Networks Learn?, Computer Vision and Pattern Recognition, May 9, 2019, pp. 3405-3414.
Vaswani et al., Attention is all you Need, Conference on Neural Information Processing Systems, Available Online at: https://arxiv.org/pdf/1706.03762.pdf, Dec. 6, 2017, 15 pages.
Vedantam et al., CIDEr: Consensus-based Image Description Evaluation, Proceedings of the Institute of Electrical and Electronics Engineers Conference on Computer Vision and Pattern Recognition, Jun. 3, 2015, 17 pages.
Mllegas et al., Phenaki: Variable Length Video Generation from Open Domain Textual Description, International Conference on Learning Representations, Oct. 5, 2022, pp. 1-17.
Wang et al., GIT: A Generative Image-to-Text Transformer for Vision and Language, Transactions of Machine Learning Research, Dec. 15, 2022, pp. 1-49.
Wen et al., Learning Progressive Point Embeddings for 3d Point Cloud Generation, Proceedings of the IEEE/CVF Conference on Computer Vision and Pattern Recognition, Jun. 1, 2021, pp. 10266-10275.
Wu et al., Learning a Probabilistic Latent Space of Object Shapes via 3D Generative-Adversarial Modeling, 29th Conference on Neural Information Processing Systems (NIPS 2016), Barcelona, Spain, Jan. 4, 2017, 11 pages.
Wu et al., PQ-NET: A Generative Part Seq2Seq Network for 3D Shapes, Proceedings of the IEEE/CVF Conference on Computer Vision and Pattern Recognition, Jun. 2020, pp. 829-838.
Xu et al., AttnGAN: Fine-Grained Text to Image Generation with Attentional Generative Adversarial Networks, In Proceedings of the Institute of Electrical and Electronics Engineers Conference on Computer Vision and Pattern Recognition, Jan. 2018, pp. 1316-1324.
Yang et al., DSG-Net: Learning Disentangled Structure and Geometry for 3D Shape Generation, ACM Transactions on Graphics (TOG), vol. 42, No. 1, Aug. 2022, pp. 1:1-1:17.
Yang et al., PointFlow: 3D Point Cloud Generation with Continuous Normalizing Flows, In Proceedings of the Institute of Electrical and Electronics Engineers/CVF International Conference on Computer Vision, Available online at: https://arxiv.org/pdf/1906.12320.pdf, Sep. 2, 2019, pp. 1-15.
Yu et al., Scaling Autoregressive Models for Content-Rich Text-to-Image Generation, Transactions on Machine Learning Research, Jun. 22, 2022, pp. 1-49.
Zhang et al., Cross-Modal Contrastive Learning for Text-to-Image Generation, Proceedings of the IEEE/CVF Conference on Computer Vision and Pattern Recognition, Apr. 14, 2022, pp. 1-19.
Zhang et al., OPT: Open Pre-trained Transformer Language Models, Available online at: https://arxiv.org/pdf/2205.01068, Jun. 21, 2022, 30 pages.
Zheng et al., SDF-StyleGAN: Implicit SDF-Based StyleGAN for 3D Shape Generation, Computer Graphics Forum, vol. 41, 2022, pp. 1-13.
Zhou et al., 3D Shape Generation and Completion through Point-Voxel Diffusion, Proceedings of the IEEE/CVF International Conference on Computer Vision, Apr. 8, 2021, 23 pages.
Zhou et al., LAFITE: Towards Language-Free Training for Text-to-Image Generation, Proceedings of the IEEE/CVF Conference on Computer Vision and Pattern Recognition (CVPR), Mar. 24, 2022, 17 pages.

* cited by examiner

400

THREE-DIMENSIONAL SHAPE GENERATION

FIELD OF THE INVENTION

This disclosure relates generally to generative artificial intelligence. More specifically, but not by way of limitation, this disclosure relates to 3-dimensional (3D) shape generation.

BACKGROUND OF THE INVENTION 3D shapes have a wide variety of applications in computer graphics, computer vision, virtual and augmented reality. Many tools are available for generating 3D shapes. However, it generally requires much expertise and effort to generate high-quality 3D shapes. Large generative models have achieved great success in producing content, such as images, videos, and audios, from text prompts. Similarly, text-to-shape generation approaches also emerge as a convenient way to democratize 3D content production.

BRIEF SUMMARY OF THE INVENTION

Certain embodiments involve 3D shape generation. In one example, a computing system receives an input text prompt and optionally a low-resolution shape occupancy map related to a 3D object. The computing system generates one or more levels of latent features based on the input prompt and/or the low-resolution shape occupancy map using a latent diffusion model. The one or more levels of latent features can include compact and accurate latent codes. The computing system decodes the one or more levels of latent features to generate a 3D shape representation using a hierarchical autoencoder. The computing system generates a 3D output shape for the 3D object based on the 3D shape representation. The 3D output shape may be provided to a client device for display or use in various applications, for example computer graphics, virtual reality, and augmented reality.

BRIEF DESCRIPTION OF THE DRAWINGS

Features, embodiments, and advantages of the present disclosure are better understood when the following Detailed Description is read with reference to the accompanying drawings.

DETAILED DESCRIPTION OF THE INVENTION

Figure 1:
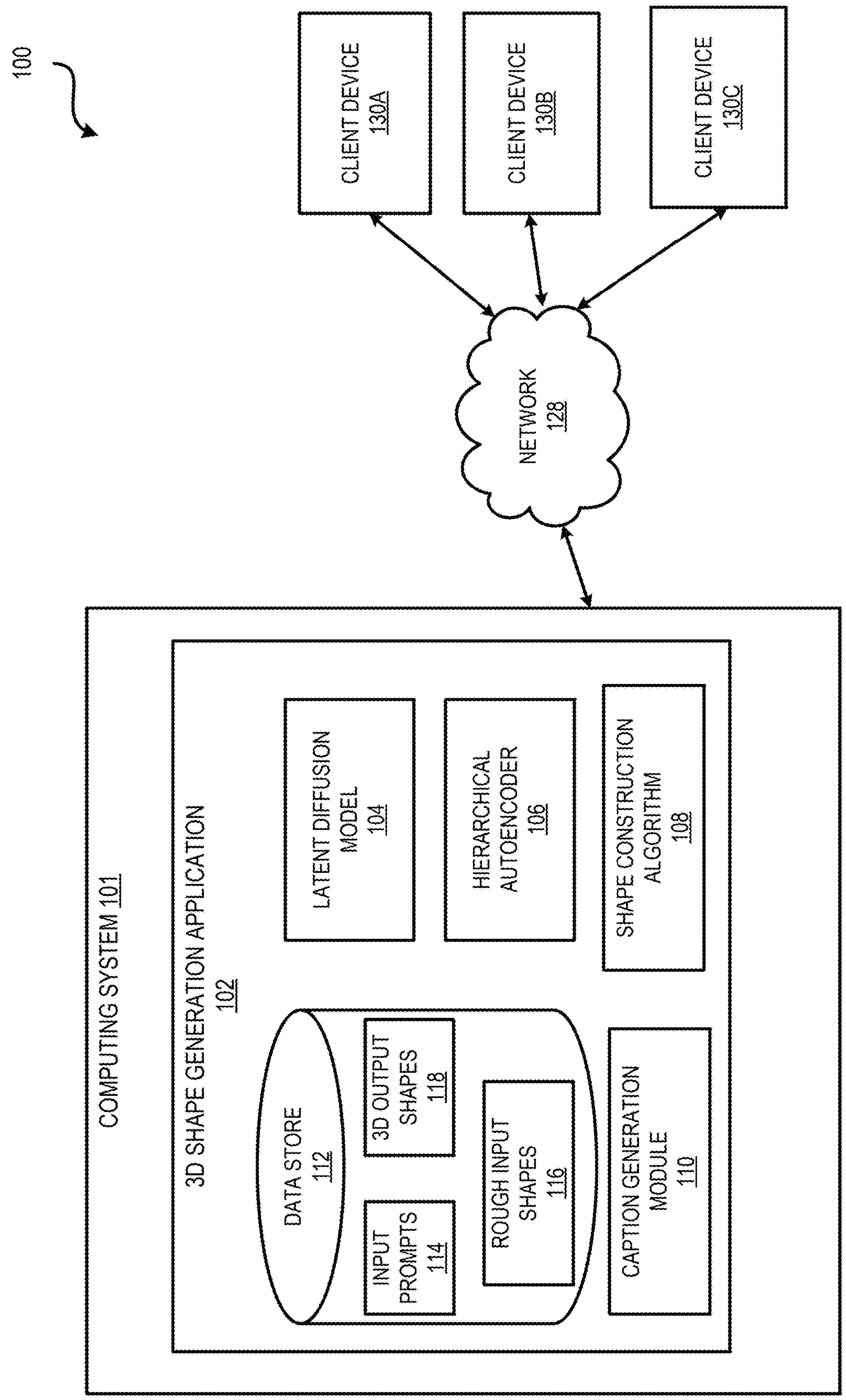
FIG. 1 depicts an example of a computing environment in which a 3D shape generation application provides one or more 3D output shapes based on an input prompt and an optional low-resolution shape occupancy map, according to certain embodiments of the present disclosure.

Certain embodiments involve 3D shape generation. For instance, a computing system receives a text prompt describing a 3D object and a low-resolution shape depicting the contour of the 3D object. The 3D object can be from different categories, such as artifact, architecture, plant, human, animal, natural object, and any thing that has a 3D shape. Compared to traditional text-to-shape methods, the low-resolution shape input provides a shape level of control besides the text-level control to improve the quality of the shape generation. The computing system generates multi-scale latent features based on the text prompt and the low-resolution shape using a latent diffusion model. The computing system decodes the multi-scale latent features to generate a 3D shape representation using a hierarchical autoencoder. Traditional direct diffusion may not be computationally feasible considering the high dimensionality of the 3D shape representation. In contrast, the latent diffusion model and the hierarchical autoencoder approach can achieve superior performance in terms of computational efficiency and shape generation quality. In addition, traditional 3D representations, such as point clouds and voxels, are redundant to represent shapes at a high resolution while meshes are not flexible to represent shapes of irregular topologies. The 3D shape representation in this disclosure can be an implicit representation of the shape of the 3D object, for example volumetric truncated Signed Distance Field (SDF), which is a compact representation of complex 3D shapes. The computing system generates a 3D output shape for the 3D object based on the 3D shape representation. The 3D output shape is a graphical representation of the 3D object in terms of the geometry, outline, surface, and external boundaries.

The following non-limiting example is provided to introduce certain embodiments. In this example, a 3D shape generation system communicates with a client device over a network. The client device provides an input prompt to the 3D shape generation system. Optionally, the client device also provides a low-resolution shape along with the input prompt.

In some examples, the 3D shape generation system generates one or more levels of latent features based on the input prompt and the low-resolution shape, using a latent diffusion model. The latent diffusion model can be a denoising diffusion probabilistic model, such as a 3D U-Net.

Gaussian noises can be applied to corrupt latent features extracted from the input prompt and the low-resolution shape. The latent diffusion model denoises the corrupted latent features to obtain one or more levels of latent features, for example a top level of latent features and a bottom level of latent features. The top level of latent features can be compact latent features derived from the low-resolution shape. The bottom level of latent features can include detailed geometry features of the 3D shape predicted from the input prompt and the low-resolution shape.

The 3D shape generation system decodes the one or more levels of latent features to generate a 3D shape representation using a hierarchical autoencoder. The hierarchical autoencoder can be a hierarchical vector quantized variational autoencoder (VQ-VAE) network. The hierarchical autoencoder decodes the one or more levels of latent features to generate a 3D shape representation. The 3D shape representation can be a Truncated-Signed Distance Field (T-SDF) volume. The 3D shape generation system then generates one or more shapes based on the 3D shape representation. The one or more output shapes can be 3D meshes generated using a marching cube algorithm.

The 3D shape generation system provides one or more output shapes to a client device, which can display the one or more output shapes. The one or more output shapes can be used in computer graphics, computer vision, virtual and augmented reality. For example, a user provides an input text prompt “a chair with two legs” and a low-resolution shape providing a rough geometry of the chair, the 3D shape generation system can provide one or more output shapes aligned with the input text prompt and the rough geometry of the low-resolution shape.

Certain embodiments of the present disclosure overcome the disadvantages of the prior art. The text input prompt and the low-resolution shape provides more intuitive text-based and geometry-based control for the generative process in a diffusion model to improve shape quality, compared to the traditional text-to-shape generation methods. The diffusion model provides multi-scale latent features with finer geometric details for a 3D shape with both the text prompt and low-resolution shape as inputs. A hierarchical autoencoder decodes the multi-scale latent features to an implicit and compact 3D shape representation, such as volumetric T-SDF. Compared to the traditional 3D representations such as point clouds, voxels, or mesh, the volumetric T-SDF representation is more flexible and compact to represent shapes of irregular shapes. Traditional direct diffusion of a 3D shape representation may not be computationally feasible considering the high dimensionality of the 3D shape representation used in the present disclosure, the latent diffusion model with the hierarchical autoencoder approach is more computationally efficient way to achieve superior shape generation quality.

Referring now to the drawings, FIG. 1 depicts an example of a computing environment 100 in which a 3D shape generation application 102 provides one or more 3D output shapes from based on an input prompt and an optional low-resolution shape occupancy map, according to certain embodiments of the present disclosure. In various embodiments, the computing environment 100 includes a computing system 101 in communication with client devices 130A, 130B, and 130C (which may be referred to herein individually as a client device 130 or collectively as the client devices 130) via a network 128. The network 128 may be a local-area network (“LAN”), a wide-area network (“WAN”), the Internet, or any other networking topology known in the art that connects the client device 130 to the 3D shape generation application 102. The computing system 101 can be a server or any other suitable computing device. In some examples, the computing system 101 is the computing system 1000 as will be described in FIG. 10. In the example of FIG. 1, the 3D shape generation application 102 is stored on and executed by the computing system 101. In other examples, the 3D shape generation application 102 could be stored on other network devices accessible by the computing system 101. The client device 130 may be a desktop computer, a laptop computer, a mobile computing device or any other suitable computing device.

The client device 130 is configured to transmit an input prompt 114 for generating 3D shapes. Optionally, the client device 130 can also provide a rough input shape 116 along with the input prompt 114. The input prompt can be a text describing the 3D shape a user intends to obtain for a 3D object. The rough input shape provides a rough geometry of the 3D shape the user intends to obtain for the 3D object. The rough input shape 116 can be a low-resolution shape occupancy map, which can be generated by a software application to represent the geometry of the space that a 3D shape takes. Alternatively, or additionally, a user may draw a rough shape to represent the overall geometry of the 3D shape the user intends to obtain.

The 3D shape generation application 102 includes a latent diffusion model 104 configured to generate one or more levels of latent features based on the input prompt 114 and the rough input shape 116. The latent diffusion model 104 can be a denoising diffusion probabilistic model, including a 3D U-Net. The latent diffusion model 104 initially determines latent features based on the input prompt 114 and the rough input shape 116. For example, the latent diffusion model 104 can extract embedding features from input prompt 114 and the rough input shape 116, and uses the embedding features as condition to predict the latent features of the 3D shape. The latent diffusion model 104 can add Gaussian noises to the initial latent features to obtain noised or corrupted latent features, and then denoise the corrupted latent features using a 3D U-Net to obtain multi-scale latent features. For example, the U-Net is trained to generate two levels of latent features, including a top level of latent features representing rough geometries and a bottom level of latent features representing detailed geometry features. Gaussian noises can be added in multiple time steps to iteratively denoise latent features to eventually obtain the multi-scale latent features.

The 3D shape generation application 102 includes a hierarchical autoencoder 106 configured to decode the multi-scale latent features to generate a 3D shape representation. The hierarchical autoencoder 106 can be a vector quantized variational autoencoder (VQ-VAE) network, including one or more encoders and one or more decoders. The one or more encoders are trained to encode a 3D shape representation to obtain latent features. The one or more decoders are trained to decode latent features to generate a 3D shape representation. The 3D shape representation can be an implicit shape representation, for example a set of volumetric truncated signed distance field (T-SDF) values.

The 3D shape generation application 102 includes a shape construction algorithm 108 configured to generate one or more 3D output shapes 118 based on the 3D shape representation. The shape construction algorithm 108 can be a marching cube algorithm or other suitable shape construction algorithms. If the 3D shape representation is a set of volumetric T-SDF values, the marching cube algorithm can transform the T-SDF values to 3D meshes, which visualize the 3D shapes.

The 3D shape generation application 102 includes a caption generation module 110 configured to generate training input prompts for training the latent diffusion model 104. Alternatively, or additionally, the caption generation module 110 is not part of the 3D shape generation application 102, but a separate module stored on the computing system 101 or a remote server (not shown). Many of the publicly available 3D datasets do not contain text descriptions for the 3D shapes in the datasets. The caption generation module 110 can implement or use an image rendering algorithm to render multiple views of a given 3D shape, resulting in a set of 2D images. The caption generation module 110 then implements or uses a 2D image captioning model to generate a caption for each 2D image, thus there can be multiple captions for the set of 2D images generated from one 3D shape. The 2D image captioning model can be first pre-trained on web-scale image-text data to recognize the contents in the rendered images. The model is then fine-tuned on a captioning dataset to enable the captioning ability. Examples of the 2D image captioning model include Bootstrapping Language-Image Pre-training for unified vision-language understanding and generation (BLIP) model, a Generative Image-to-text Transformer (GIT) model, or other suitable models and their variances. For each word in a caption, the probabilities of that word given the different images are pooled together to make a joint decision whether to include it in the final caption of the 3D shape. A single coherent caption can be generated as the final caption of the 3D shape, by taking into account all rendered views of the 3D shape model. Examples of pooling methods can include mean pooling, max pooling, majority voting (where only the top word from each rendered image is considered). Thus, the caption generation module 110 produces a unified caption for the 3D shape by combining the captions for each 2D image together using a joint decoding method. This way, for a set of training shapes, the caption generation module 110 can generate corresponding captions as training input prompts.

To ensure diversity in the generated captions for the set of 2D images for the 3D shape, the caption generation module 110 employs a nucleus sampling approach. This approach selects the top words with probability sums up to a predetermined value (e.g., 0.9), allowing a varied and diverse set of captions while avoiding degeneration from unexpected words. In addition, a temperature parameter can be set at a higher value (e.g., 0.7) to make the distribution sharper to exclude unexpected words. To further ensure the alignment between the generated captions with the 3D shape, the caption generation module 110 can implement or use a Contrastive Language-Image Pretraining (CLIP) model to rank the generated captions and identify the highest quality captions.

The data store 112 is configured to store data processed or generated by the 3D shape generation application 102. Alternatively, or additionally, the data store 112 is part of the computing system 101, that is accessible by the 3D shape generation application 102. Examples of the data stored in data store 112 include the input prompts 114, the rough input shapes 116, and the 3D output shapes 118. Training data used for training the latent diffusion model 104 and the hierarchical autoencoder 106 can also be stored in the data store 112. In addition, data generated by the 3D shape generation application 102 during a shape generation process, for example multi-scale latent features and 3D shape representations can also be stored in the data store 112, temporarily or permanently. The network architecture shown in FIG. 1 is provided by way of example only. In other embodiments, the 3D shape generation application 102 could also or alternatively be executed locally on a client device 130 or on other device(s) not shown. The 3D shape generation application 102 can, in some embodiments, be a component of a larger software program, for example a graphics editing application.

Figure 2:
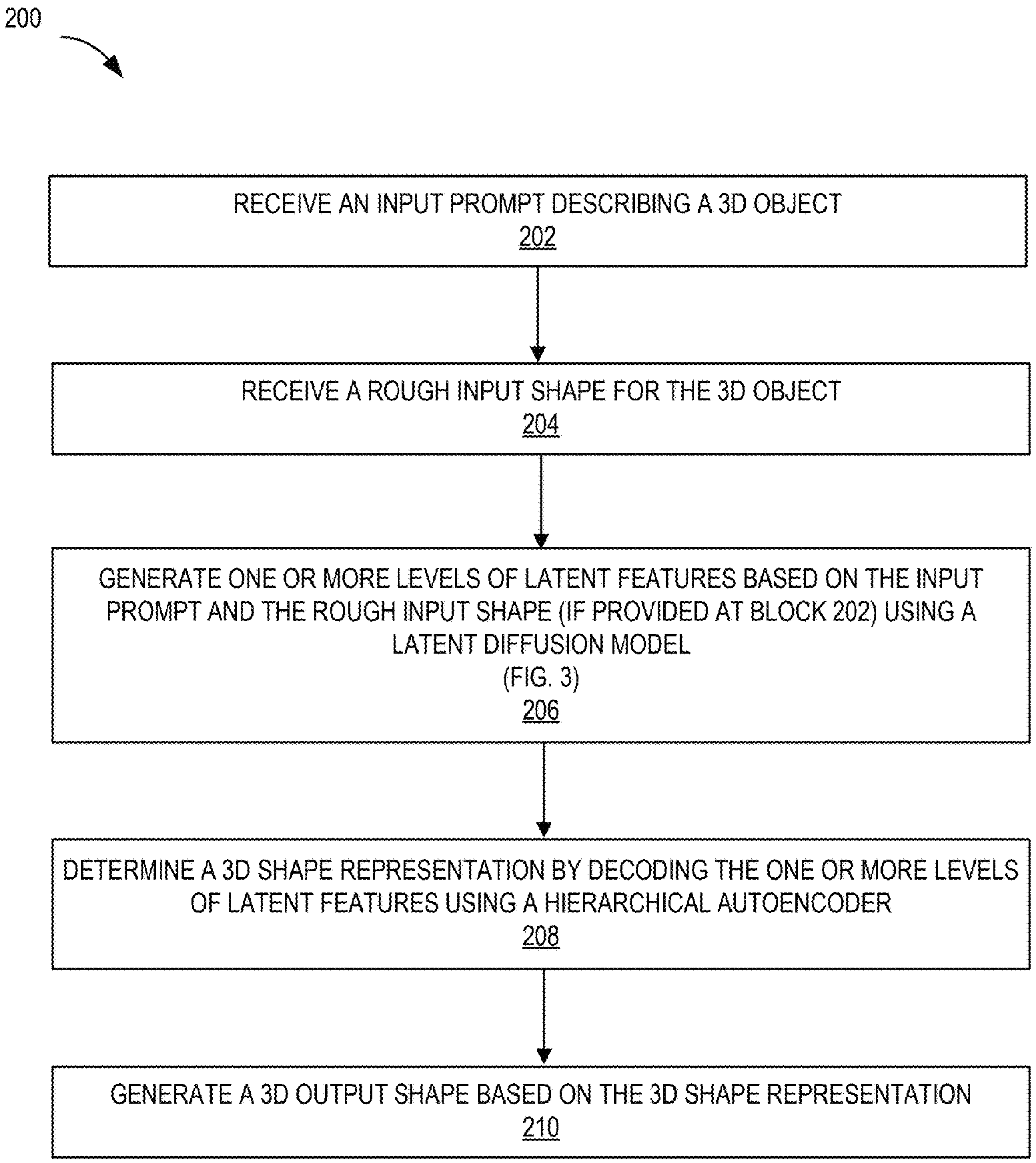
FIG. 2 depicts an example of a process for generating one or more 3D shapes, according to certain embodiments of the present disclosure.

FIG. 2 depicts an example of a process 200 for generating one or more 3D shapes, according to certain embodiments of the present disclosure. At block 202, a computing system 101 receives an input prompt 114 describing a 3D object. The input prompt 114 can include textual descriptions related to the shape a user intends to obtain for the 3D object. For example, the input prompt 114 is "a chair with two legs." In some examples, the user provides the input prompt 114 to the computing system 101 via a client device 130 associated with the user.

At block 204, the computing system 101 receives a rough input shape 116 for the 3D object. Along with the input prompt 114 to the computing system 101, the user can also provide a rough input shape 116. The rough input shape 116 can be a low-resolution shape created by the user manually or via a software tool. The rough input shape 116 can also be a low-resolution shape occupancy map including grid cells. Each grid cell has a value representing the probability of the occupancy of that grid cell. Values close to I represent a higher probability that the cell is occupied by a shape. Values close to 0 represent a lower probability that the cell is not occupied by the shape. Thus, the occupancy map can represent a rough geometry of the 3D shape the user intends to obtain for the 3D object. The occupancy map can be generated by a software tool, which may or may not be part of the computing system 101. The input prompt 114 provides a text-based control for the 3D output shapes, and the rough input shape 116 provides a geometry-based control for the 3D output shapes. The rough input shape can be optional.

At block 206, the computing system 101 generates one or more levels of latent features based on the input prompt and the rough input shape (if provided at block 204) using a latent diffusion model 104. The computing system 101 includes a 3D shape generation application 102, which includes a latent diffusion model 104. In some examples, the latent diffusion model 104 can extract latent codes from the input prompt and the rough input shape (if also provided) and apply randomly sampled Gaussian noises to the latent codes to obtain corrupted or noised latent codes. The latent diffusion model 104 can denoise the corrupted or noised latent codes with multiple steps in sequence to obtain multi-level latent features (e.g., multi-level latent codes). For example, the latent diffusion model 104 includes a 3D U-Net. The 3D U-Net can be trained to generate two levels of latent features, including a top level of latent features (e.g., a top-level latent code) representing rough geometry features (e.g., represented in the rough input shape) and a bottom level of latent features (e.g., a bottom-level latent code) representing detailed geometry features. Details about obtaining one or more levels of latent features related to the shape of a 3D object are illustrated in FIG. 3 as will be described below.

Figure 3:
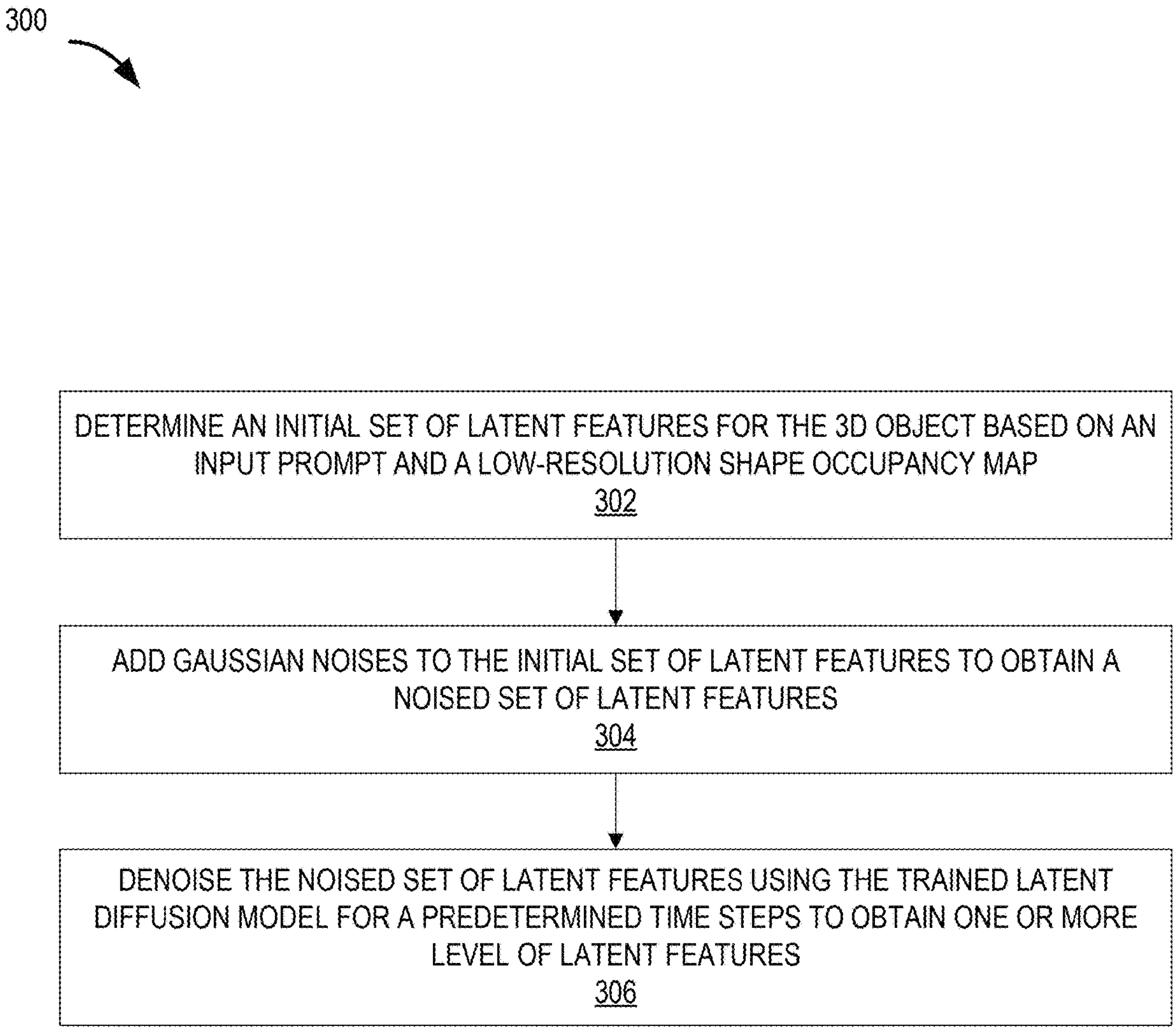
FIG. 3 depicts an example of a process for obtaining one or more levels of latent features related to the shape of a 3D object, according to certain embodiments of the present disclosure.

Turning to FIG. 3, FIG. 3 depicts an example of a process 300 for obtaining one or more levels of latent features related to the shape of a 3D object, according to certain embodiments of the present disclosure. At block 302, a computing system 101 determines an initial set of latent features for the 3D object based on an input prompt and a low-resolution shape occupancy map. In some examples, the latent diffusion model 104 or another component of the 3D shape generation application 102 on the computing system 101 extracts embedding features of the input prompt and the low-resolution shape occupancy map, received at blocks 202 and 204. The embedding features can represent the initial set of latent features for the 3D object.

At block 304, the computing system 101 adds Gaussian noises to the initial set of latent features to obtain a noised set of latent features. Gaussian noise is a signal noise that has a probability density function equal to that of the normal distribution. In other words, the noise value is in normal distribution. In some examples, the latent diffusion model 104 includes a component for generating and adding Gaussian noises. In some examples, Gaussian noises are provided by a component separate from the latent diffusion model 104. The initial set of latent features is corrupted by Gaussian noises to become a noised set of latent features.

At block 306, the computing system 101 denoising the noised set of latent features using a trained latent diffusion model for a predetermined time steps to obtain one or more levels of latent features. In some examples, the trained latent diffusion model 104 randomly samples the noised set of latent features to obtain a sample set of noised latent features for denoising. The denoising can be repeated for multiple time steps (e.g., 200, 500, or 100) to obtain one or more levels of latent features related to the shape of the 3D object. Functions included in block 204 and FIG. 3 can be used to implement a step for generating one or more levels of latent features based on the input prompt using a latent diffusion model.

Returning to FIG. 2, at block 208, the computing system 101 determines a 3D shape representation by decoding the one or more levels of latent features using a hierarchical autoencoder 106. The hierarchical autoencoder 106 of the 3D shape generation application 102 in the computing system 101 includes one or more encoders and one or more decoders. During implementation, such as the process 200, the encoders are not used. The one or more decoders can decode the one or more levels of latent features to generate a 3D shape representation. In some examples, the hierarchical autoencoder 106 applies a vector quantization operation to map the top-level latent features to the nearest element in a jointly learned top-level codebook to obtain quantized top-level latent features. Similarly, the hierarchical autoencoder 106 applies a vector quantization operation to map the bottom-level latent features to the nearest element in a jointly learned bottom-level codebook to obtain quantized bottom-level latent features. The quantized top-level latent features and the quantized bottom-level latent features are then provided to the one or more decoders to generate a 3D shape representation. The 3D shape representation can be a 3D shape model, including a set of volumetric T-SDF values.

At block 210, the computing system 101 generates a 3D output shape 118 based on the 3D shape representation. The 3D shape generation application 102 in the computing system 101 includes a shape construction algorithm 108. In some examples, the shape construction algorithm 108 can be a marching cube algorithm, transforming the set of T-SDF values into a 3D mesh as the 3D output shape 118. The 3D output shape 118 can be provided to a client device 130 for display or use in another application.

Figure 4:
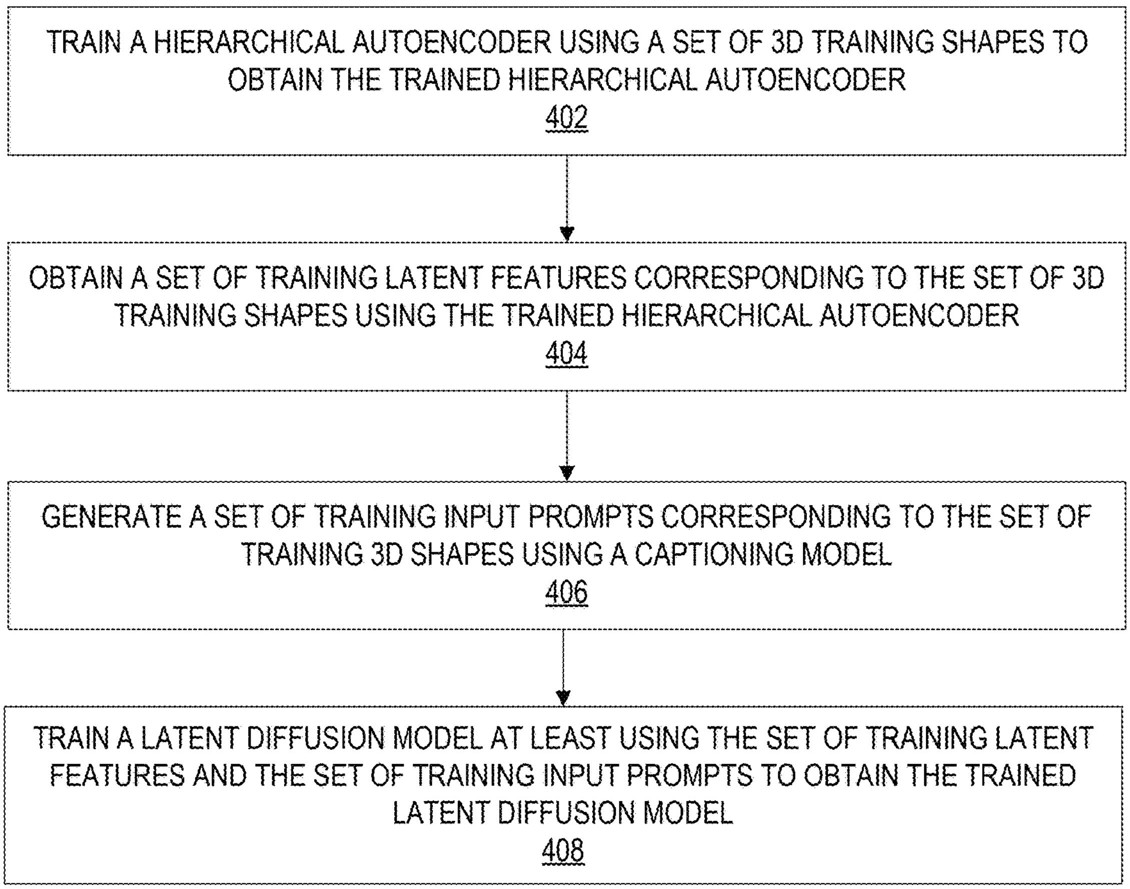
FIG. 4 depicts an example of a process for the training different components of the 3D shape generation application in FIG. 1, according to certain embodiments of the present disclosure.

FIG. 4 depicts an example of a process 400 for the training different components of the 3D shape generation application 102 in FIG. 1, according to certain embodiments of the present disclosure. At block 402, the computing system 101 trains a hierarchical autoencoder 106 using a set of training 3D shapes to obtain the trained hierarchical autoencoder. The set of training 3D shapes can be from a publicly available dataset. The set of training 3D shapes can be shape representations or shape models, for example T-SDF volumes. The hierarchical autoencoder 106 in the 3D shape generation application 102 can include one or more encoders and one or more decoders. The one or more encoders are trained to generate a set of latent features for the set of training 3D shapes. The one or more decoders are trained to reconstruct the set of training 3D shapes based on the latent features generated from the one or more encoders. Details about training the hierarchical autoencoder 106 is described in FIG. 5 as shown below.

At block 404, the computing system 101 obtains a set of training latent features corresponding to the set of 3D training shapes using the trained hierarchical autoencoder. The trained encoders of the hierarchical autoencoder 106 at block 402 can generate a set of latent codes (latent features) for the set of 3D training shapes. In some examples, there are two levels of encoders, a top-level encoder and a bottom-level encoder. The set of latent codes can include a top-level latent code and a bottom-level latent code for a corresponding 3D training shape. The top-level latent code can be upsampled and concatenated with the bottom-level latent code to become a single latent code for the corresponding 3D training shape. Thus, a set of training latent codes are obtained for the set of 3D training shapes.

At block 406, the computing system 101 generates a set of training input prompts corresponding to the set of training 3D shapes using a captioning model. In some examples, the caption generation module 110 in the 3D shape generation application implements or uses an image rendering algorithm to render multiple views of a 3D training shape to obtain a set of 2D images. The caption generation module 110 then implements or uses a 2D image captioning model to generate a caption for each 2D image, thus there can be multiple captions for the set of 2D images generated from one 3D shape. The caption generation module 110 then produces a unified caption for the 3D training shape by combining the captions for each 2D image together using a joint decoding method. Thus, a set of captions are generated for the set of corresponding 3D training shapes. The set of captions can be used as training input prompts corresponding to the set of training 3D shapes.

At block 408, the computing system 101 trains a latent diffusion model 104 at least using the set of training latent features and the set of training input prompts to obtain the trained latent diffusion model. In a forward process, the latent diffusion model 104 can progressively add random Gaussian noises to corrupt a training latent code (latent feature) corresponding to a 3D training shape into a random latent code. In a reverse process, the random latent code is used to train a 3D U-Net of the latent diffusion model 104 to denoise the random latent code back to the training latent code. In some examples, a set of rough shapes corresponding to the set of 3D training shapes can also be provided along with the set of corresponding training input prompts to as conditions to train the 3D U-Net of the latent diffusion model 104. The set of rough shapes can be low-resolution occupancy maps for the set of 3D training shapes. Details about training the hierarchical autoencoder are described in FIG. 6 below.

Figure 5:
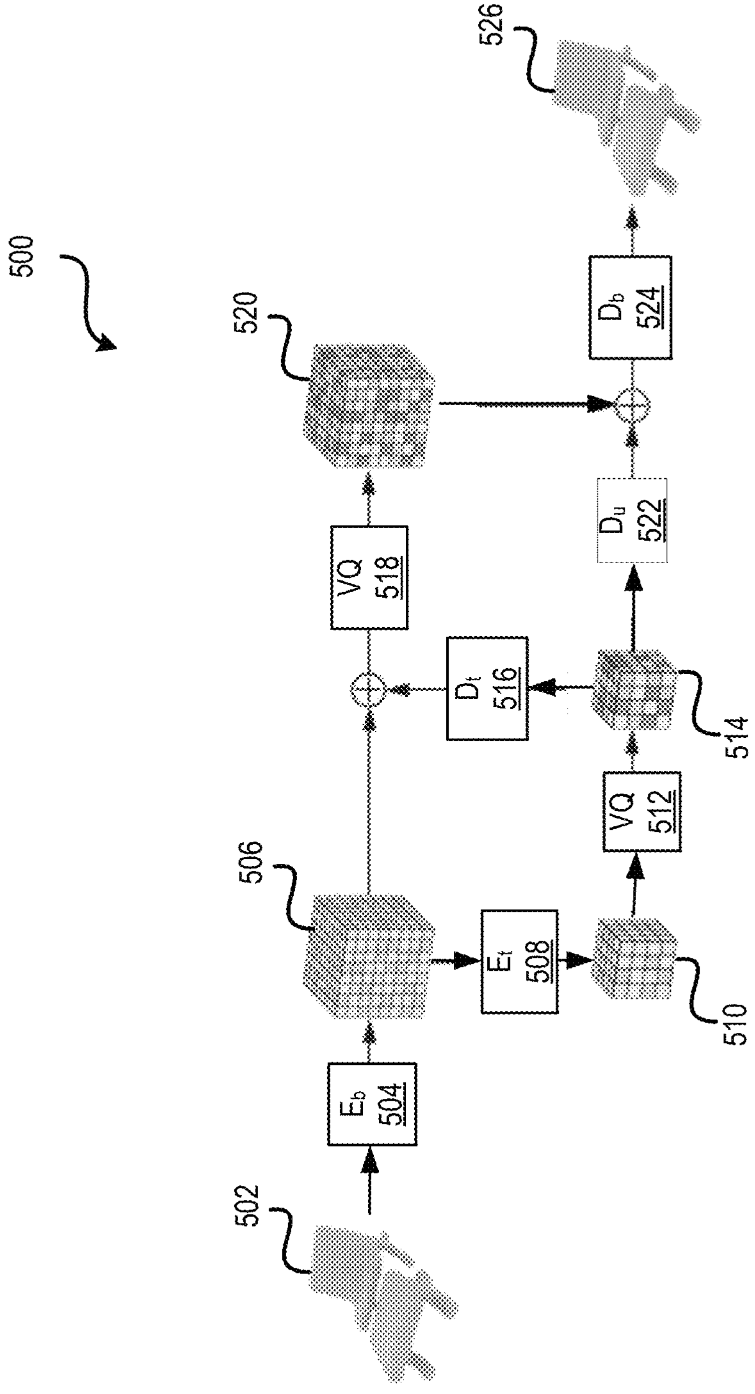
FIG. 5 depicts an example of a diagram for training the hierarchical autoencoder in FIG. 1, according to certain embodiments of the present disclosure.

FIG. 5 depicts an example of a diagram 500 for training the hierarchical autoencoder 106 in FIG. 1, according to certain embodiments of the present disclosure. The hierarchical autoencoder 106 in FIG. 1 can be a hierarchical VQ-VAE, as shown in FIG. 5. The hierarchical VQ-VAE includes two encoders (e.g., a top-level encoder Et 508 and a bottom-level encoder Eb 504), two decoders (e.g., a top-level decoder Dt 516 and a bottom-level decoder Db 524), and a transposed convolutional layer Du 522.

The two encoders 504 and 508 can be convolutional encoder networks, which can be trained to encode 3D shapes into multi-scale latent codes. The two decoders 516 and 524 can be trained to decode the multi-scale (or multi-level) latent codes to the corresponding 3D shapes. Because the latent codes are at different scales, they can be used to reconstruct detailed 3D shapes with high accuracy.

For example, the bottom-level encoder Eb 504 can contain 4 Residual Downsampling Convolution blocks with number of channels as 64, 128, 128 and 256 respectively. The first block has no downsampling and the rest blocks have the downsampling ratio as 2. The top-level encoder E: 508 can contain 1 residual convolutional block and 1 residual downsampling convolutional block. The number of their channels are 64 and 128. It also has a spatial self-attention layer at the end with 128 channels.

The decoder structure can be symmetric to the encoders, where the downsampling layers are replaced with upsampling layers. For example, the top-level decoder Dt 516 has 1 residual convolution block and 1 residual upsampling convolution block. The number of their channels are 64 and 128. The upsampling ratio is 2. It also has a spatial self-attention layer with 128 channels after the first residual convolution block. The bottom-level decoder Db 524 can contain 4 residual upsampling convolution blocks with number of channels of 64, 128, 128 and 256 respectively. The first block has no upsampling and the rest blocks have the upsampling ratio as 2. It also has an output convolution layer to transform the dense feature into T-SDF space with 1 channel.

A 3D shape representation can be used for training the hierarchical VQ-VAE. For example, a T-SDF volume. An input T-SDF volume 502 can be encoded into two latent representations using the two encoders. In FIG. 5, the input T-SDF volume 502 can be provided to the bottom-level encoder Eb 504 to generate a bottom-level latent representation 506, which is for the bottom-level latent code and has a lower resolution than the input T-SDF volume 502. The bottom-level latent representation is provided to the top-level encoder E: 508 to generate a top-level latent representation 510, which is for the top-level latent code and has a lower resolution than the bottom latent representation. For example, if the input T-SDF volume 502 has a resolution of 128×128×128, the bottom-level latent representation has a resolution of 16×16×16, and the top-level latent representation has a resolution of 8×8×8. A vector quantization step 512 can be applied to map the top-level latent representation 510 to the nearest element in a jointly learned top-level codebook to obtain the top-level latent code 514. The top-level latent code 514 then passes through the top-level decoder Dt 316 to upsample its resolution to match the bottom-level latent representation 506, and then concatenate with the bottom-level latent representation 506. A vector quantization step 518 is applied to map the concatenated latent representation to nearest element in a bottom-level codebook to obtain the bottom-level latent code 520. In FIG. 5, the input T-SDF volume 502 is encoded into two levels of latent codes 514 and 520 and achieves much better shape reconstruction quality than existing encoding methods which encode the shape via local patches. Both the top-level and bottom-level codebooks can have an embedding dimension of 16 and a codebook size of 512. In the decoding step, the transposed convolutional layer Du 322 is employed to upsample the top-level latent code 514 to match the resolution of the bottom-level latent code 520, and to concatenate with the bottom-level latent code 520 in the channel dimension. The concatenated code is then passed through the bottom-level decoder Db 524 to generate a 3D shape representation 526, which reconstructs the input T-SDF volume 502.

For training the hierarchical VQ-VAE, a L2 reconstruction loss between input T-SDFs and output T-SDFs and vector quantize codebook losses for both the top and bottom codebooks can be used to optimize the network weights, for example using an Adam optimization algorithm. The trained encoders can be used to generate both the top-level latent code and bottom-level latent code for training the latent diffusion model 104, as shown in FIG. 6 below.

Figure 6:
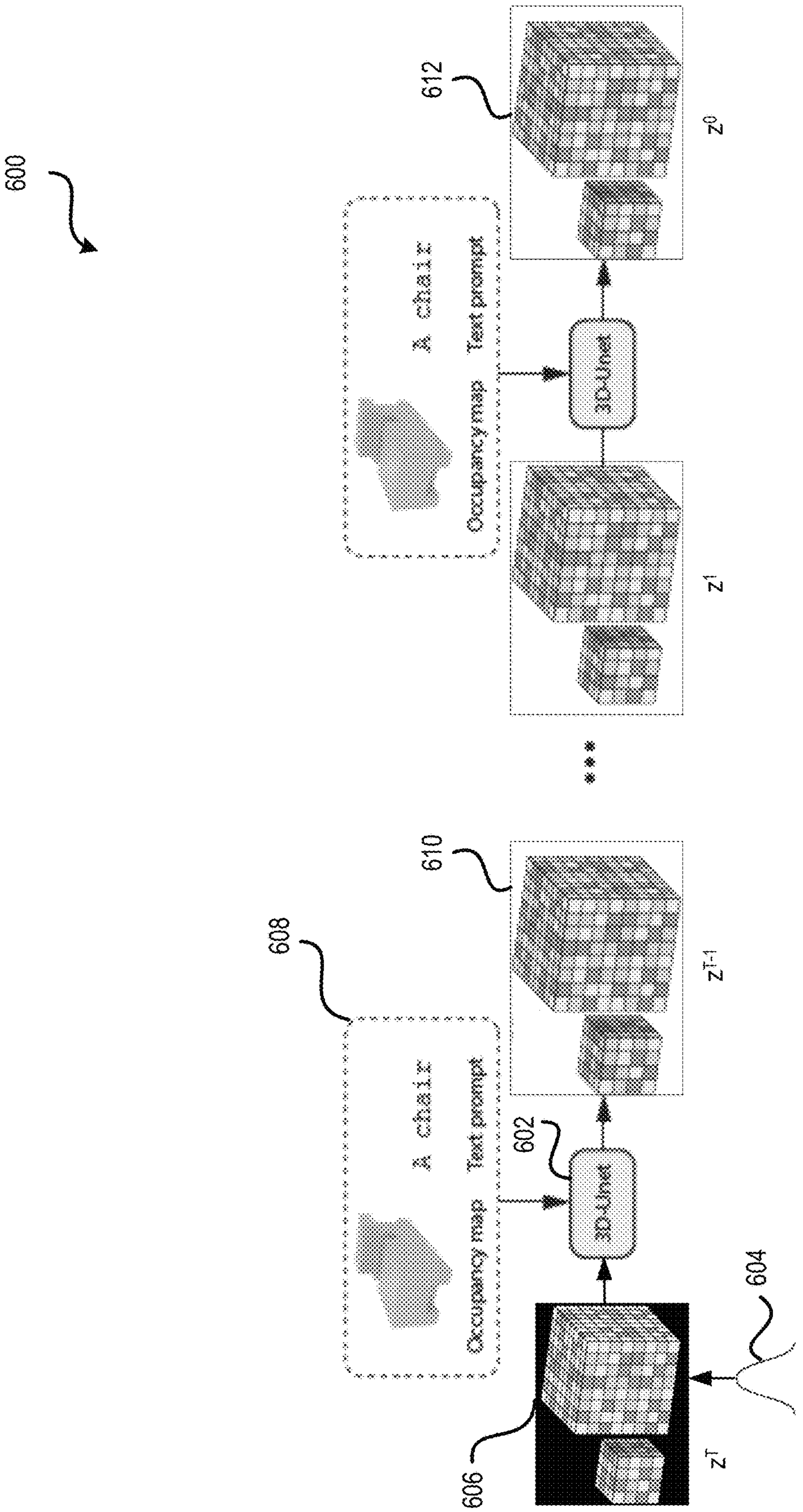
FIG. 6 depicts an example of a diagram for training the latent diffusion model in FIG. 1, according to certain embodiments of the present disclosure.

FIG. 6 depicts an example of a diagram 600 for training the latent diffusion model 104 in FIG. 1, according to certain embodiments of the present disclosure. The latent diffusion model 104 in FIG. 1 can include a 3D U-Net 602, which can be trained as shown in FIG. 6. The 3D U-Net 602 in FIG. 6 uses a stack of residual blocks and downsampling convolutions, followed by a stack of residual blocks with upsampling convolutions, with skip connections connecting symmetric layers with the same spatial size. The input of the 3D U-Net 602 can include 33 channels which consist of 32 channels of latent codes and 1 channel of occupancy map. The encoder of the 3D U-Net 602 contains six residual blocks with number of channels as 128, 128, 256, 256, 512, 512 respectively and two downsampling layers that downsample 16×16×16 input into 4×4×4 feature maps. The decoder of the 3D U-Net 602 has symmetric residual blocks and two upsampling layers that upsample 4×4×4 feature maps into 16×16×16 output. The 3D U-Net 602 also includes a transformer layer consisting of a self-attention layer and a cross-attention layer, after each residual block.

The 3D U-Net 602 can be trained to denoise a noised input, denoted as $\epsilon_\theta(z^i, i)$, i=1, . . . , T, where T is the number of denoising steps and $z^i$ is a noised version of an input latent $z_{tb}$. To enable different levels of controllability, the 3D U-Net 602 can be conditioned on two different levels of input conditions. At the semantic level, the 3D U-Net 602 is conditioned on text prompts c, which can be encoded by a CLIP text encoder as text features and injected through the cross-attention layer for attending spatial features to the text features. At the geometry level, the 3D U-Net 602 can be conditioned on the occupancy map o through concatenation. The training objective can be shown in Equation (1).

$$\mathcal{L}_{DM} = \mathbb{E}_{z,\epsilon\sim N(0,1),i}\left\|\epsilon - \epsilon_\theta(z^i, i, c, o)\right\|_2^2 \quad (1)$$

In FIG. 6, at the first step of the training process, Gaussian noises 604 are applied to training latent codes $z^0$ obtained from FIG. 5 to obtain corrupted latent codes $z^T$ 506. Conditional inputs 608 are also provided to the 3D U-Net 602. The conditional input 608 includes a text prompt and an occupancy map. The 3D U-Net 602 denoises the corrupted latent code $z^T$ 606 to obtain a less corrupted latent code $z^{T-1}$ 610 at the first training step, which can be used as input to the 3D U-Net 602 for at the second training step. There can be T training steps until the 3D U-Net 602 provides a denoised training latent code $z^o$ 612. The training latent codes provided by FIG. 5 and the noised latent codes $z^t$ at different denoising steps can include two levels of latent codes, that is, a top-level latent code and a bottom-level latent code. The training steps T can be 200, 500, 1000, or other suitable number of training steps until the 3D U-Net 602 provides a reasonably denoised version of the training latent codes.

A curriculum learning approach can be used during training to learn different components of $z^t$. At the beginning of the training, more weight is given to the top component of $z^t$ to learn rough shape generation. During the training process, the loss weight on the bottom component of $z^t$ is gradually increased to learn fine details of the 3D shapes.

In some examples, the text prompts c and the occupancy map o can be randomly dropped out during training to enable different modes of conditions, including text only, occupancy map only, and both text and occupancy map. The dropping process can follow a classifier-free diffusion guidance method to trade off mode coverage and sample fidelity. For example, during the first 10% training steps, the 3D U-Net 602 is only conditioned on the occupancy map o. during the last 90% training steps, the 3D U-Net 602 is only conditioned on the text prompts.

Figure 7:
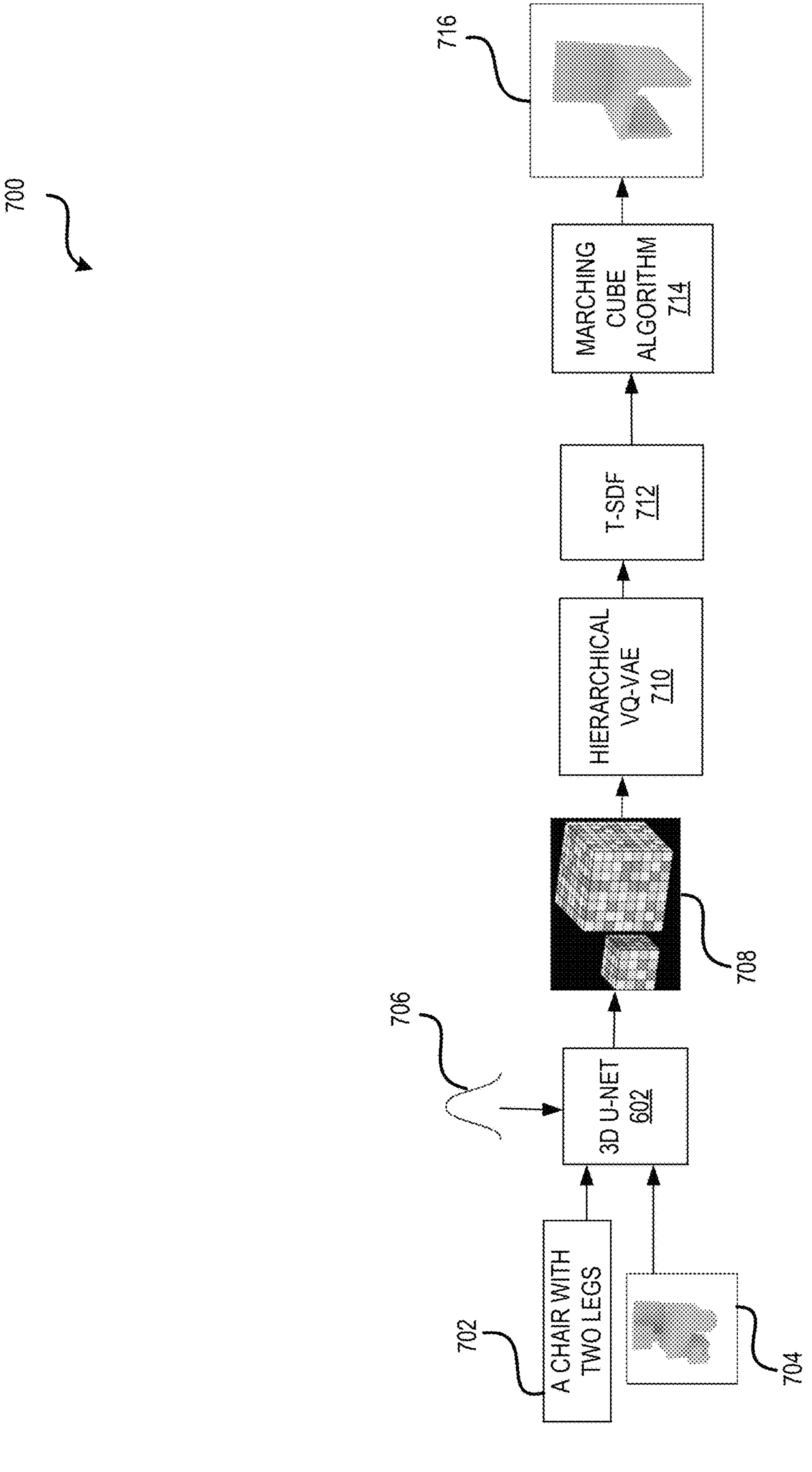
FIG. 7 depicts an example of a diagram for generating 3D output shapes using the 3D shape generation application whose components are trained as described in FIGS. 5 and 6, according to certain embodiments of the present disclosure.

FIG. 7 depicts an example of a diagram 700 for generating 3D output shapes using the 3D shape generation application 102 whose components are trained as described in FIGS. 5 and 7, according to certain embodiments of the present disclosure. In FIG. 7, a text prompt 702 "a chair with two legs" and an occupancy map 704 are provided to the 3D U-Net 602 trained in FIG. 6. Latent features extracted from the text prompt 702 and the occupancy map 704 can be disturbed by Gaussian noises 706. The 3D U-Net 602 can denoise the noised latent features for a predetermined number of steps (e.g., 200, 500, or 1000) and generate two levels of latent codes 708. The two levels of latent codes 708 can be provided a hierarchical VQ-VAE 710, which includes encoders and decoders as trained in FIG. 5. Only decoders are used during the process in FIG. 7 for decoding the two levels of latent codes 708 to generate a T-SDF volume 712 as a shape representation. The T-SDF volume 712 can be provided to a marching cube algorithm 714, to generate a 3D shape 716 of a chair with two legs aligned with the text prompt 702 and the occupancy map 704.

Figure 8:
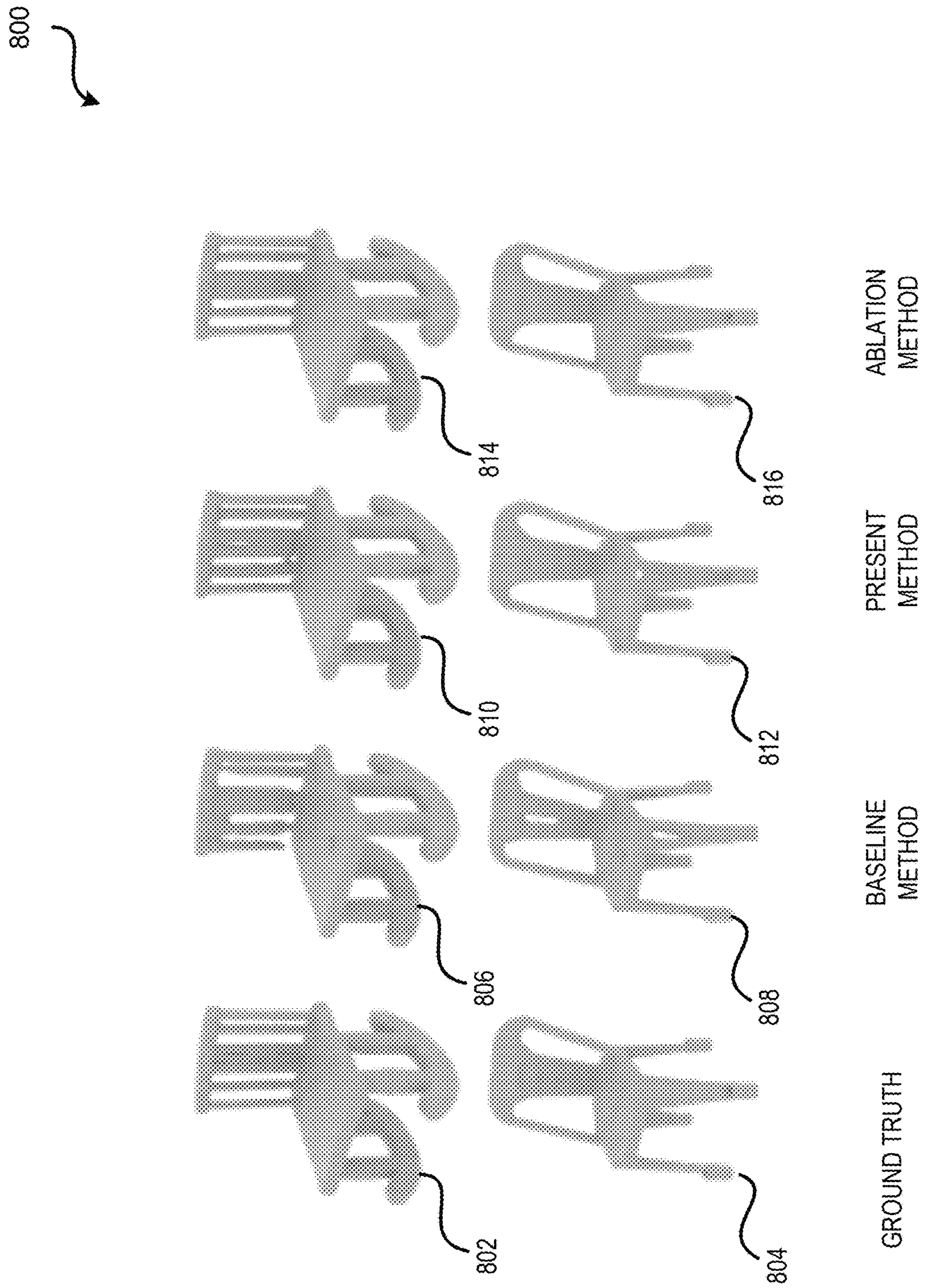
FIG. 8 depicts an example of a comparison of shape inversion quality between the present method described herein and other methods, according to certain embodiments of the present disclosure.

FIG. 8 depicts an example of a comparison 800 of shape inversion quality between the present method described herein and other methods, according to certain embodiments of the present disclosure. The hierarchical autoencoder 106 can include multiple layers (e.g., 2) of encoders to encode a shape into multiple levels of latent codes and uses multiple layers (e.g., 2) of decoders to decode multiple levels of latent codes. An ablation method based on the hierarchical autoencoder 106 can be developed to only use one encoder to encode a shape into a single level of latent code, for comparison. A previous method, for example AutoSDF, is also used for comparison. FIG. 8 shows the reconstructed shapes from the three methods. Two ground truth shapes 802 and 804 are reconstructed by the three methods. Shapes 806 and 808 are reconstructed by the previous method. Shapes 810 and 812 are reconstructed by the present method with a hierarchical autoencoder network. Shapes 814 and 816 are reconstructed by the ablation method that uses only a single encoder and decoder. It can be seen from FIG. 8 that shapes 810 and 812 capture more details of the ground truth shapes 802 and 804 respectively, compared to shapes 806 and 808 reconstructed by the previous method and shapes 614 and 616 reconstructed by the ablation method.

Table 1 shows the quantitative comparison of the shape inversion quality. Three evaluation metrics are used for evaluating the shape inversion quality. The Intersection over Union (IoU) measures the spatial overlapping between the reconstructed shape and the input shape. The Chamfer Distance (CD) score measures the geometric layout of shape outliers via sampled points. The F-score measures the percentage of shape surface points that was reconstructed correctly. It can be seen from Table 1 that the present method with a hierarchical autoencoder network outperforms the other two methods.

TABLE 1

Shape Inversion Comparison

| Method | IoU↑ | CD↓ | F-score 1% ↑ |
|---|---|---|---|
| Previous Method | 0.81 | 0.86 | 0.40 |
| Ablation Method | 0.85 | 0.85 | 0.41 |
| Present Method | 0.90 | 0.84 | 0.42 |

Figure 9:
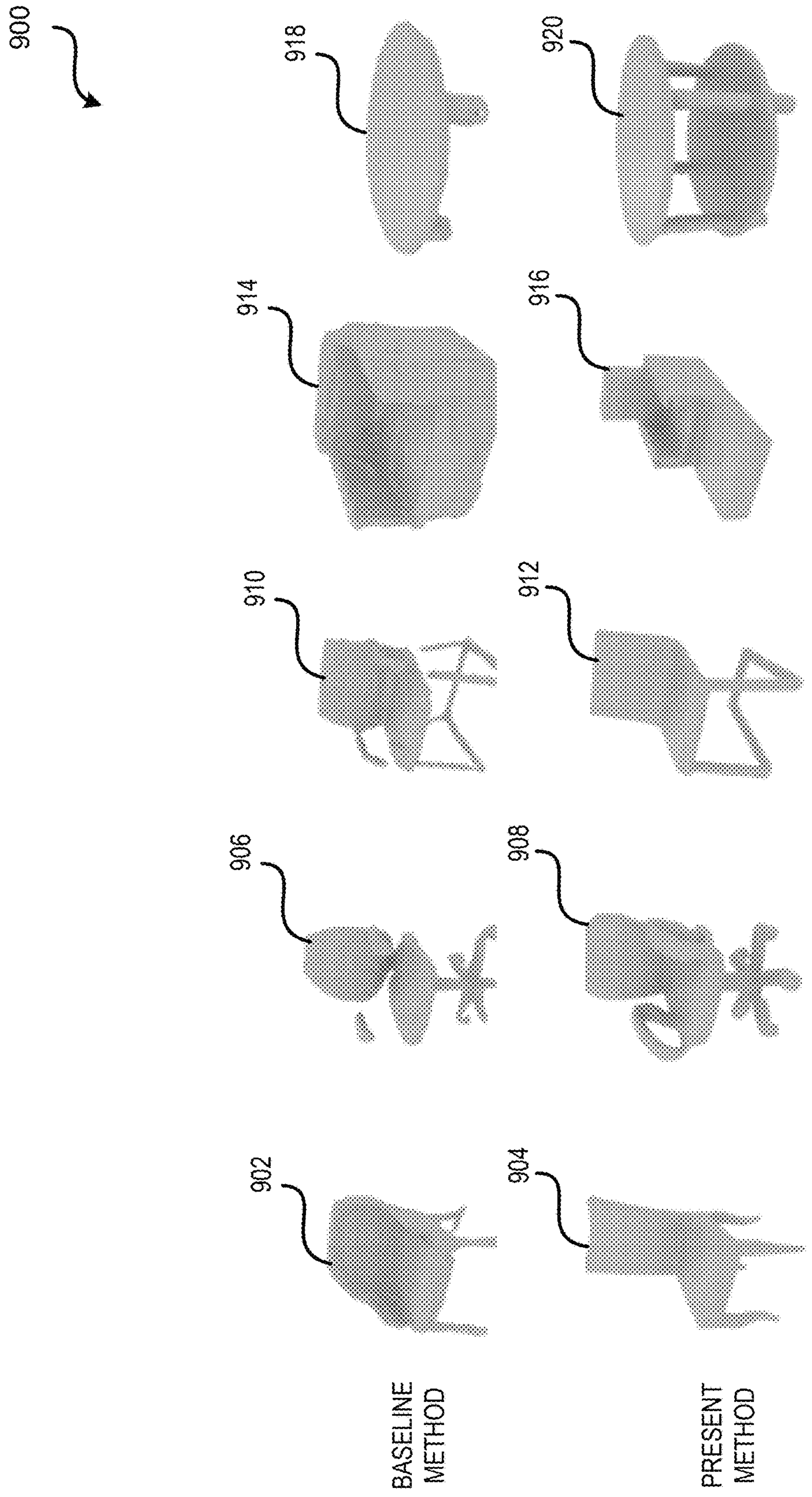
FIG. 9 depicts an example of a comparison of language-guided shape generation by the present method described herein and a baseline method, according to certain embodiments of the present disclosure.

FIG. 9 depicts an example of a comparison 900 of language-guided shape generation by the present method described herein and a baseline method, according to certain embodiments of the present disclosure. The baseline method can be a previous state-of-the-art method, for example a towards implicit text-guided (TITG) 3D shape generation method. With a text prompt "a chair with a puffy gray brown seat and a wooden back," the baseline method generates a shape 902, and the present method generates a shape 904. With a text prompt "brown color cushion rolling chair with hand support," the baseline method generates a shape 906, and the present method generates a shape 908. With a text prompt "a molded silver colored chair with folded metal," the baseline method generates a shape 910, and the present method generates a shape 912. With a text prompt "a dark purple lounge chair that has three cushions," the baseline method generates a shape 914, and the present method generates a shape 916. With a text prompt "round and small teapoy with telephone shaped legs," the baseline method generates a shape 918, and the present method generates a shape 920. The present method is robust to color and texture related noises from the input prompts. It can be seen that shapes 904, 908, 912, 916, and 920 generated by the present method have higher quality and are more aligned with the text prompts, than those generated by the baseline method.

Table 2 shows quantitative comparison of the language-guided shape generation. Two metrics are used for measuring the quality of the generated shapes, a CLIP score and a Fréchet inception distance (FID) score. The CLIP score measures the textual alignment, that is, the coherence between the text prompt and the 3D shape representation (or 3D shape model). The FID score measures the quality of the shape. Shapes generated by the baseline method and the present method respectively based on a text prompt each have a CLIP score and an FID score. Meanwhile, the ground truth shape corresponding to the text prompt also has a ground-truth CLIP score and a ground-truth FID score. It can be seen from Table 2 that the present method largely closes the gap to the ground truth scores.

TABLE 2

Quantitative Comparison of the Language-guided Shape Generation

| Method | CLIP Score↑ | FID score↓ |
|---|---|---|
| Ground Truth | 23.7 | 0.0 |
| Baseline Method | 22.9 | 97.1 |
| Present Method | 23.4 | 47.5 |

Figure 10:
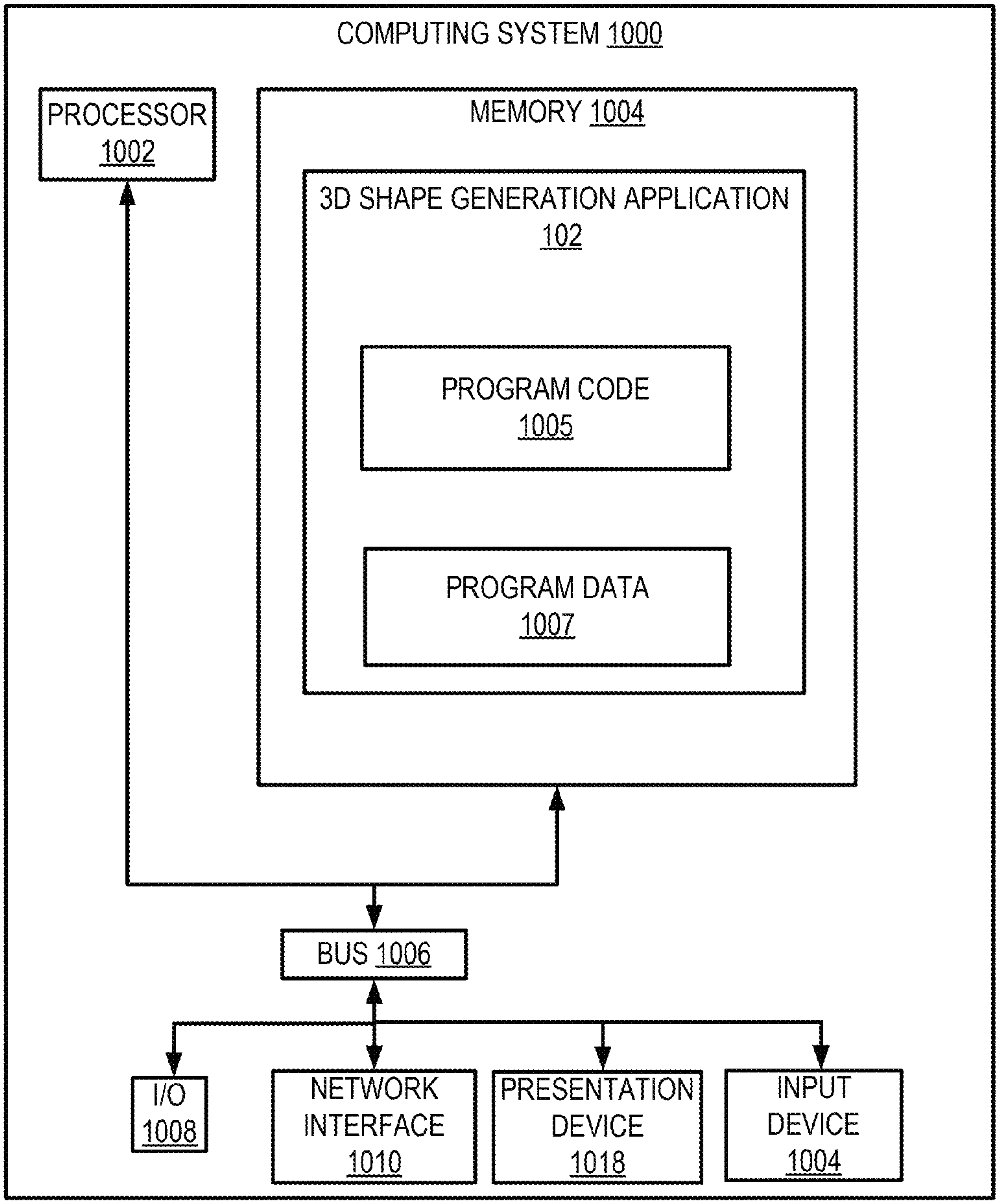
FIG. 10 depicts an example of the computing system for implementing certain embodiments of the present disclosure.

Any suitable computing system or group of computing systems can be used for performing the operations described herein. For example, FIG. 10 depicts an example of the computing system 1000 for implementing certain embodiments of the present disclosure. The implementation of computing system 1000 could be used to implement the 3D shape generation application 102. In other embodiments, a single computing system 1000 having devices similar to those depicted in FIG. 10 (e.g., a processor, a memory, etc.) combines the one or more operations depicted as separate systems in FIG. 1.

The depicted example of a computing system 1000 includes a processor 1002 communicatively coupled to one or more memory devices 1004. The processor 1002 executes computer-executable program code stored in a memory device 1004, accesses information stored in the memory device 1004, or both. Examples of the processor 1002 include a microprocessor, an application-specific integrated circuit ("ASIC"), a field-programmable gate array ("FPGA"), or any other suitable processing device. The processor 1002 can include any number of processing devices, including a single processing device.

A memory device 1004 includes any suitable non-transitory computer-readable medium for storing program code 1005, program data 1007, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 executes program code 1005 that configures the processor 1002 to perform one or more of the operations described herein. Examples of the program code 1005 include, in various embodiments, the application executed by the 3D shape generation application 102, or other suitable applications that perform one or more operations described herein. The program code may be resident in the memory device 1004 or any suitable computer-readable medium and may be executed by the processor 1002 or any other suitable processor.

In some embodiments, one or more memory devices 1004 stores program data 1007 that includes one or more datasets and models described herein. Examples of these datasets include single-view feature representations (e.g., single-view feature triplanes), multi-view feature representations (e.g., multi-view feature triplanes), 3D representations, etc. In some embodiments, one or more of data sets, models, and functions are stored in the same memory device (e.g., one of the memory devices 1004). In additional or alternative embodiments, one or more of the programs, data sets, models, and functions described herein are stored in different memory devices 1004 accessible via a data network. One or more buses 1006 are also included in the computing system 1000. The buses 1006 communicatively couples one or more components of a respective one of the computing system 1000.

In some embodiments, the computing system 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, and/or the like. The computing system 1000 is able to communicate with one or more other computing devices (e.g., client device 130) via a data network using the network interface device 1010.

The computing system 1000 may also include a number of external or internal devices, an input device 1020, a presentation device 818, or other input or output devices. For example, the computing system 1000 is shown with one or more input/output ("I/O") interfaces 1008. An I/O interface 1008 can receive input from input devices or provide output to output devices. An input device 1020 can include any device or group of devices suitable for receiving visual, auditory, or other suitable input that controls or affects the operations of the processor 1002. Non-limiting examples of the input device 1020 include a touchscreen, a mouse, a keyboard, a microphone, a separate mobile computing device, etc. A presentation device 1018 can include any device or group of devices suitable for providing visual, auditory, or other suitable sensory output. Non-limiting examples of the presentation device 1018 include a touchscreen, a monitor, a speaker, a separate mobile computing device, etc.

Although FIG. 10 depicts the input device 1020 and the presentation device 1018 as being local to the computing device that executes the 3D shape generation application 102, other implementations are possible. For instance, in some embodiments, one or more of the input device 1020 and the presentation device 1018 can include a remote client-computing device that communicates with the computing system 1000 via the network interface device 1010 using one or more data networks described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method performed by one or more processing devices, comprising:

receiving a text prompt and a low-resolution shape occupancy map describing a 3-dimensional (3D) object;

generating multiple latent representations based on the text prompt and the low-resolution shape occupancy map using a trained latent diffusion model, wherein the multiple latent representations correspond to multiple resolution levels;

determining a 3D shape representation by decoding the multiple latent representations using a trained hierarchical autoencoder; and generating a 3D shape for the 3D object based on the 3D shape representation.

2. The method of claim 1, further comprising:

determining an initial set of latent features for the 3D shape to be generated based on the low-resolution shape occupancy map and the text prompt;

adding Gaussian noises to the initial set of latent features to obtain a noised set of latent features; and denoising the noised set of latent features using the trained latent diffusion model for a predetermined time steps to obtain the multiple latent representations.

3. The method of claim 1, wherein the multiple latent representations comprise a top-level latent representation and a bottom-level latent representation, wherein the top-level latent representation corresponds to rough geometry features, and wherein the bottom-level latent representation corresponds to detailed shape features.

4. The method of claim 1, wherein the trained latent diffusion model is a denoising diffusion probabilistic model, comprising a 3D U-Net.

5. The method of claim 1, wherein the trained hierarchical autoencoder comprises a hierarchical vector quantized Variational Autoencoders (VQ-VAE) network.

6. The method of claim 1, further comprising:

training a hierarchical autoencoder using a set of training 3D shape models to obtain the trained hierarchical autoencoder;

obtaining a set of training latent features using the trained hierarchical autoencoder;

generating a set of training input prompts corresponding to the set of training 3D shape models using a captioning model; and training a latent diffusion model at least using on the set of training latent features and the set of training input prompts to obtain the trained latent diffusion model.

7. The method of claim 1, wherein the 3D shape representation comprises a set of volumetric Truncated-Signed Distance Field (T-SDF) values.

8. The method of claim 7, wherein generating the 3D shape for the 3D object based on the 3D shape representation comprising transforming the set of volumetric T-SDF values into a 3D mesh using a marching cube algorithm.

9. A system, comprising:

a memory component storing computer-executable instructions;

a processing device coupled to the memory component, the processing device configured to execute the computer-executable instructions to perform operations comprising:

receiving a text prompt and a low-resolution shape occupancy map describing a 3-dimensional (3D) object;

generating multiple latent representations based on the text prompt and the low-resolution shape occupancy map using a trained latent diffusion model, wherein the multiple latent representations correspond to multiple resolution levels;

determining a 3D shape representation by decoding the multiple latent representations using a trained hierarchical autoencoder; and generating a 3D shape for the 3D object based on the 3D shape representation.

10. The system of claim 9, wherein the processing device is configured to execute the computer-executable instructions to perform further operations comprising:

determining an initial set of latent codes for the 3D shape to be generated based on the low-resolution shape occupancy map and the text prompt;

adding Gaussian noises to the initial set of latent codes to obtain a noised set of latent codes; and denoising the noised set of latent codes using the trained latent diffusion model for a predetermined time steps to obtain the multiple latent representations.

11. The system of claim 9, wherein the multiple latent representations comprise a top-level latent representation and a bottom-level latent representation, wherein the top-level latent representation corresponds to rough geometry features, and wherein the bottom-level latent representation corresponds to detailed shape features.

12. The system of claim 9, wherein the trained latent diffusion model is a denoising diffusion probabilistic model, comprising a 3D U-Net, and wherein the trained hierarchical autoencoder comprises a hierarchical vector quantized Variational Autoencoders (VQ-VAE) network.

13. The system of claim 9, wherein the processing device is configured to execute the computer-executable instructions to perform further operations comprising:

training a hierarchical autoencoder using a set of training 3D shape models to obtain a trained hierarchical autoencoder;

obtaining a set of training latent features using the trained hierarchical autoencoder;

generating a set of training input prompts corresponding to the set of training 3D shape models using a captioning model; and training a latent diffusion model at least using the set of training latent features and the set of training input prompts to obtain the trained latent diffusion model.

14. The system of claim 9, wherein the 3D shape representation comprises a set of volumetric Truncated-Signed Distance Field (T-SDF) values.

15. The system of claim 14, wherein generating a 3D shape for the 3D object based on the 3D shape representation comprising transforming the set of volumetric T-SDF values into a 3D mesh using a marching cube algorithm.

16. A non-transitory computer-readable medium, storing executable instructions, which when executed by a processing device, cause the processing device to perform operations comprising:

receiving a text prompt and a low-resolution shape occupancy map describing a 3-dimensional (3D) object;

a step for generating multiple latent representations based on the text prompt and the low-resolution shape occupancy map using a trained diffusion model, wherein the multiple latent representations correspond to multiple resolution levels;

determining a 3D shape representation by decoding the multiple latent representations using a trained hierarchical autoencoder; and generating a 3D shape for the 3D object based on the 3D shape representation.

17. The non-transitory computer-readable medium of claim 16, wherein the operations further comprise:

determining an initial set of latent codes for the 3D shape to be generated based on the low-resolution shape occupancy map and the text prompt;

adding Gaussian noises to the initial set of latent codes to obtain a noised set of latent codes; and denoising the noised set of latent codes using the trained diffusion model for a predetermined time steps to obtain the multiple latent representations.

18. The non-transitory computer-readable medium of claim 16, wherein the operations further comprise:

training a hierarchical autoencoder using a set of training 3D shape models to obtain a trained hierarchical autoencoder;

obtaining a set of training latent features using the trained hierarchical autoencoder;

generating a set of training input prompts corresponding to the set of training 3D shape models using a captioning model; and training a diffusion model at least using the set of training latent features and the set of training input prompts to obtain the trained diffusion model.

19. The non-transitory computer-readable medium of claim 16, wherein the trained diffusion model is a denoising diffusion probabilistic model, comprising a 3D U-Net, and wherein the trained hierarchical autoencoder comprises a hierarchical vector quantized Variational Autoencoders (VQ-VAE) network, wherein the 3D shape representation comprises a set of volumetric Truncated-Signed Distance Field (T-SDF) values, and wherein the 3D shape for the 3D object comprises a 3D mesh.

* * * * *